US007267152B2

(12) United States Patent
Berger et al.

(10) Patent No.: US 7,267,152 B2
(45) Date of Patent: Sep. 11, 2007

(54) DEVICE FOR THE GUIDING OF INDIVIDUAL REINFORCEMENT THREADS

(75) Inventors: Markus Berger, Sehnde (DE); Rainer Oehl, Grossburgwedel (DE); Klaus Binder, Sarstedt (DE); Christoph Bederna, Wunstorf (DE)

(73) Assignee: Contitech Luftfedersysteme GmbH, Hannover (DE)

( * ) Notice: Subject to any disclaimer, the term of this patent is extended or adjusted under 35 U.S.C. 154(b) by 299 days.

(21) Appl. No.: 10/518,850

(22) PCT Filed: May 16, 2003

(86) PCT No.: PCT/DE03/01585

§ 371 (c)(1),
(2), (4) Date: Feb. 16, 2005

(87) PCT Pub. No.: WO2004/002719

PCT Pub. Date: Jan. 8, 2004

(65) Prior Publication Data

US 2005/0127230 A1    Jun. 16, 2005

(30) Foreign Application Priority Data

Jun. 28, 2002    (DE) .............................. 102 29 078

(51) Int. Cl.
*B65H 81/00* (2006.01)

(52) U.S. Cl. ...................... 156/430; 156/169; 156/173; 156/175; 156/425; 156/431; 156/432

(58) Field of Classification Search ................ 156/169, 156/172, 173, 175, 425, 428, 430, 431, 432

See application file for complete search history.

(56) References Cited

U.S. PATENT DOCUMENTS

| 2,093,206 | A | * | 9/1937 | Muller ............................. 57/7 |
| 2,918,104 | A | * | 12/1959 | Scott et al. .................. 156/180 |
| 3,201,298 | A | * | 8/1965 | Baker et al. ................. 156/431 |
| 3,332,815 | A |   | 7/1967 | Havens |
| 3,378,427 | A | * | 4/1968 | McClean ..................... 156/431 |
| 3,736,210 | A | * | 5/1973 | Kaczerginski .............. 156/431 |
| 4,028,164 | A | * | 6/1977 | Montagut .................... 156/173 |
| 4,172,562 | A | * | 10/1979 | Smith .......................... 156/169 |
| 4,288,267 | A |   | 9/1981 | McLarty |
| 4,361,459 | A | * | 11/1982 | Martin ........................ 156/425 |
| 4,432,302 | A | * | 2/1984 | Farris et al. ................. 118/410 |
| 4,494,436 | A | * | 1/1985 | Kruesi ......................... 156/148 |
| 4,631,101 | A | * | 12/1986 | Rix .............................. 156/175 |
| 6,263,937 | B1 |  | 7/2001 | Barnes |
| 6,494,980 | B1 |  | 12/2002 | Röthemeyer et al. |

FOREIGN PATENT DOCUMENTS

DE    19846852 A1 *  4/2000
EP     1099531 A1 *  5/2001

* cited by examiner

*Primary Examiner*—Jeff H. Aftergut

(57) ABSTRACT

An arrangement (1) for guiding individual reinforcement filaments (2) onto a carrier (3) has a positioning disc (4) with a plurality of filament guides (9) arranged distributed on a circular ring of the positioning disc (4). The carrier is moveable in the direction of the carrier axis (X). The arrangement also includes a rotationally symmetrical deflecting element (5). The positioning disc (4) and the deflecting element (5) each concentrically surround the carrier (3). The deflecting element (5) is mounted within the positioning disc (4) and aligned axially to the positioning disc (4). The inlet-end peripherally extending inner edge (6) of the deflecting element (5) faces toward the carrier (3) and is curved. The filament guides (9) open directly at the curved inner edge (6).

4 Claims, 2 Drawing Sheets

DEVICE FOR THE GUIDING OF INDIVIDUAL REINFORCEMENT THREADS

This application is the national stage of International Application No. PCT/DE 2003/001585, filed May 16, 2003, designating the United States.

FIELD OF THE INVENTION

The invention relates to an arrangement for guiding individual reinforcement filaments onto a carrier which can be advanced in the direction of the carrier axis.

BACKGROUND OF THE INVENTION

An arrangement is known, for example, from U.S. Pat. No. 6,494,980 and is used especially for a bobbin creel for working in individual reinforcement filaments into a hose blank. A rubber hose is extruded onto a mandrel in an endless method. A dense layer of filaments is spiraled onto this first rubber layer in that a bobbin creel rotates about the carrier formed of mandrel and rubber hose. By advancing the carrier in the axial direction thereof, a spirally-shaped filament layer is formed having a filament angle which is dependent upon the advancing speed and the rotational speed of the bobbin creel.

From U.S. Pat. No. 6,494,980, it is known that the filaments are guided through a row of holes which are arranged equidistantly from each other on a peripheral line of a positioning ring. One reinforcement filament is guided radially inwardly through each hole. The positioning ring concentrically surrounds or encloses a rotation-symmetric, funnel-shaped deflecting element. The deflecting element has a continuously tapering channel having an annularly-shaped inlet opening and a smaller annularly-shaped outlet opening. The reinforcement filaments are guided on the radially inner surface of the deflecting element onto the carrier which is surrounded by the deflecting element.

It has been shown that threading through holes is very work intensive. Furthermore, the reinforcement filaments run freely and unguided between the holes in the positioning ring and the carrier on a relatively long radial inner surface. This is so because the positioning ring must have a large diameter in order to accommodate all bores. In this way, no constant spacing of the reinforcement filaments on the carrier can be ensured. In addition, it is possible that individual reinforcement filaments cross over each other.

SUMMARY OF THE INVENTION

The object of the invention is therefore to provide an improved arrangement for guiding individual reinforcement filaments with which the above disadvantages are solved.

The object is solved by:

a positioning disc having a plurality of filament guides arranged distributed on the circular ring of the positioning disc; and, a rotation-symmetrical deflecting element.

The positioning disc and the deflecting element each surround the carrier concentrically. The deflecting element is mounted within the positioning disc and is aligned axially to the positioning disc. The peripherally-extending inner edge of the deflecting element faces at the inlet end toward the carrier and is curved and the filament guides of the positioning disc open directly at the end face of the curved inner edge.

The diameter, on which the reinforcement filaments are guided, can be significantly reduced by the use of a positioning disc with slots in lieu of a position ring with bores. The positioning disc surrounds the deflecting element. In this way, the distance is considerably reduced on which the reinforcement filaments run free and unguided between the filament guides and the carrier and a migration and crossing of the filaments is prevented. The work intensive threading of the reinforcement filaments in the bores is substituted by the better and more rapid placement of the filaments in the slits.

Advantageously, the filament guides are configured of struts or webs extending radially or mounted inclined. In this way, the number of reinforcement filaments, which are guidable with the arrangement, is considerably increased compared to bores because only a strut with a low thickness is needed between the slits and the reinforcement filaments can be easily placed in the slits.

Preferably, a circular band-shaped cover disc can be releasably, for example, magnetically, mounted on the surface of the positioning disc in the region of the filament guides. The cover disc prevents that the filaments slip out of the filament through-guide openings, especially the slits.

For threading reinforcement filaments into the arrangement when preparing a spiralizing arrangement, it is advantageous when a cover disc with a slit, which extends radially, is mounted on the surface of the positioning disc in the region of the filament through-guide openings. In the area of the slit, reinforcement filaments can be threaded in this manner while the already threaded reinforcement filaments are reliably held by the cover disc. The cover disc is preferably magnetically adherable to the positioning disc especially for facilitating the preparation operation and can be rotated from slit to slit.

BRIEF DESCRIPTION OF THE DRAWING

The invention will now be described with reference to the drawings wherein.

DESCRIPTION OF THE PREFERRED EMBODIMENTS OF THE INVENTION

Figure 1:
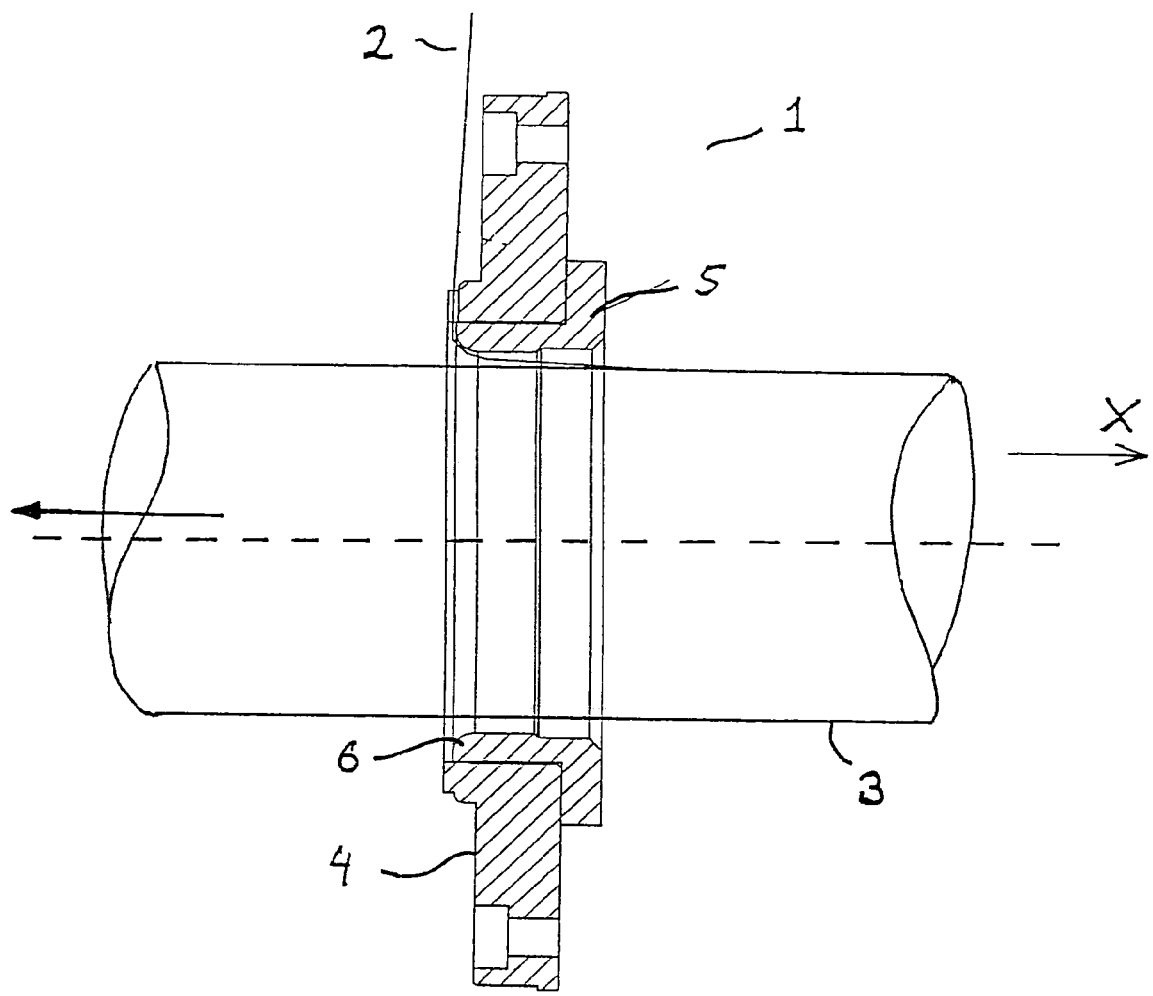
FIG. 1 shows a cross-sectional view of the arrangement of the invention for guiding individual reinforcement filaments.

FIG. 1 shows an arrangement 1 for guiding individual reinforcement filaments 2 onto a carrier 3 which is advanced in the direction of the carrier axis X. The carrier 3 is concentrically surrounded by the arrangement 1.

The arrangement 1 has a positioning disc 4 having a plurality of filament guides which are configured as struts extending radially outwardly. The filament guides are distributed equidistantly from each other on the circular ring of the positioning disc 4.

A rotational symmetrical deflecting element 5 is axially mounted below the positioning disc 4. The inner edge 6 of the deflecting element 5 faces the carrier 3 on the run-in side and is curved so that the reinforcement filaments 2 are deflected at an angle onto the carrier 3. The filament guides of the positioning disc 4 are mounted in such a manner with respect to the deflecting element 5 that the reinforcement filaments 2 are guided directly to the end face of the curved inner edge 6 and the distance is shortened in which the filaments 2 run freely from the filament guides to the carrier 3. Furthermore, a lateral migration and overlayering of the filaments 2 is prevented by a small deflecting surface of the inner edge 6 and a very small air gap to the carrier 3.

In the embodiment shown, the deflecting element 5 is in the form of a sleeve pushed into the positioning disc 4.

Figure 2:
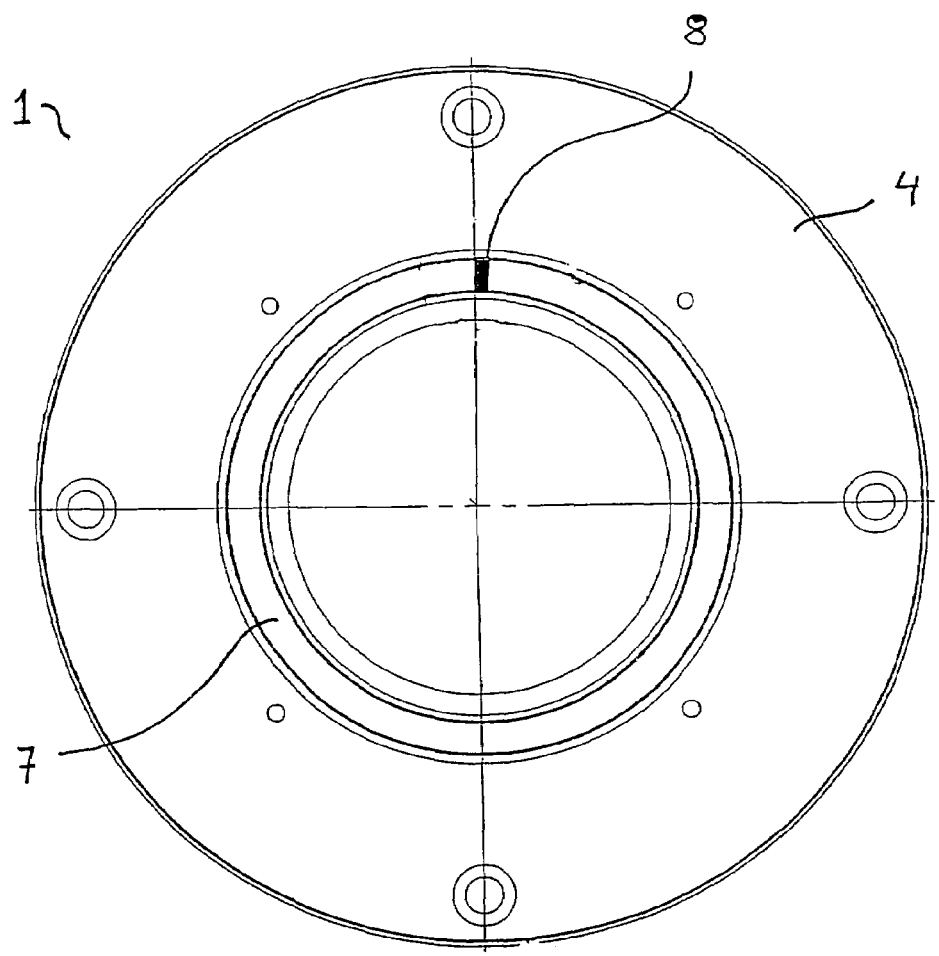
FIG. 2 is a front view of the arrangement of FIG. 1.

FIG. 2 shows a front view of the arrangement 1. A circular annular cover disc 7 is magnetically adherable to the surface of the positioning disc 4 in the region of the filament guides. The cover disc 7 has an assembly slit 8 in order to clear at least one selected filament guide and to make possible a threading of a reinforcement filament 2 into the filament guide on the carrier 3. For preparing a bobbin creel, the cover disc 7 is successively rotated and the reinforcement filaments 2 are sequentially guided through the corresponding filament guides. The cover disc 7 prevents that already threaded reinforcement filaments 2 can again become disengaged from the filament passthrough opening.

Figure 3:
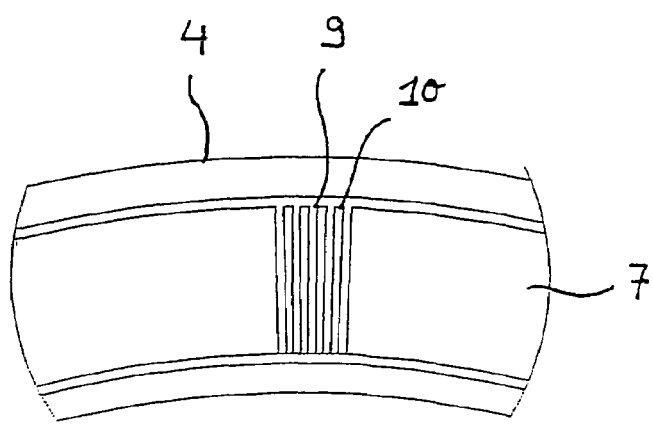
FIG. 3 is a detail view of a portion of FIG. 2.

FIG. 3 shows a detail view of the positioning disc having a magnetically adhered cover disc 7. The filament guides 9 can be seen in the region of the assembly slit 8 of the cover disc 7. The filament guides 9 are formed by struts extending radially outwardly. The reinforcement filaments 2 can therefore be easily placed in the slits.

The invention claimed is:

1. An arrangement for guiding individual reinforcement filaments (2) onto a carrier (32) defining a carrier axis (X) with said carrier (32)) being moveable in the direction of said carrier axis (X), the arrangement comprising:

a positioning disc (4) having a plurality of filament guides (9) arranged distributed on an axial end surface of a circular ring of said positioning disc (4) and configured by struts (10) extending radially or mounted inclined;

a rotation-symmetrical deflecting element (5); said positioning disc (4) and said deflecting element (5) each concentrically enclosing said carrier (32); said deflecting element (5) being mounted within said positioning disc (4) and being axially aligned to said positioning disc (4); said deflecting element (5) having an end face and a peripherally extending curved inner edge (6) formed on said end face and said curved inner edge (6) being toward said carrier (32) at the run-in end; and, said filament guides (9) opening directly at said curved inner edge (6).

2. The arrangement of claim 1, further comprising a circular band-shaped cover disc which can be releasably assembled on the surface of the positioning disc in the region of the filament guides.

3. The arrangement of claim 2, wherein said cover disc has a radially extending slit.

4. The arrangement of claim 2, wherein said cover disc is magnetically adherable to the positioning disc.

* * * * *